United States Patent
Wolf et al.

(10) Patent No.: US 7,116,272 B2
(45) Date of Patent: Oct. 3, 2006

(54) DIRECTION AND DISTANCE FINDER FOR LOCATING DISTRESS SIGNALS

(76) Inventors: Edward A. Wolf, 7963 NW. 70th Ave., Parkland, FL (US) 33067; Mark Clark, 16631 SW. 59th Ct., Fort Lauderdale, FL (US) 33331

( * ) Notice: Subject to any disclaimer, the term of this patent is extended or adjusted under 35 U.S.C. 154(b) by 0 days.

(21) Appl. No.: 11/189,144

(22) Filed: Jul. 26, 2005

(65) Prior Publication Data

US 2005/0270234 A1    Dec. 8, 2005

Related U.S. Application Data

(63) Continuation-in-part of application No. 10/709,656, filed on May 20, 2004, now Pat. No. 6,933,889.

(60) Provisional application No. 60/477,125, filed on Jun. 9, 2003.

(51) Int. Cl.
   *G01S 5/04* (2006.01)
(52) U.S. Cl. ............. 342/443; 342/458; 455/90.1
(58) Field of Classification Search ......... 342/385, 342/417, 419, 443, 457, 458; 455/90.1; 340/539.21
   See application file for complete search history.

(56) References Cited

U.S. PATENT DOCUMENTS

| | | | |
|---|---|---|---|
| 4,131,791 A | * | 12/1978 | Lego, Jr. ............. 398/171 |
| 6,031,482 A | | 2/2000 | Lemaitre et al. |
| 6,167,249 A | | 12/2000 | Hereford et al. |
| 6,960,996 B1 | * | 11/2005 | Sackl ............. 340/539.11 |
| 2005/0231359 A1 | * | 10/2005 | Kampel et al. ....... 340/539.13 |

* cited by examiner

*Primary Examiner*—Dao Phan
(74) *Attorney, Agent, or Firm*—Malin, Haley & DiMaggio, P.A.

(57) ABSTRACT

The present invention relates to a system and method for locating the direction and distance to a RF signal source from an avalanche beacon to find an avalanche victim. The system and method includes a RF signal locator and a graphical display residing on the signal locator. The receiver graphical display provides the searcher with an initial way point reading that includes directional and distance data associated with the beacon RF signal source from the avalanche beacon. The directional and distance data is based upon the received RF signals. A processor within the locator receiver receives and measures RF signals emitted by the RF signal source. The locator advantageously provides continuous subsequent way point readings for the user, where the subsequent way point readings include directional and distance data associated with the RF signal source. The distance data provided by the subsequent way point readings is based upon a path loss slope of the received RF signals from the avalanche beacon.

10 Claims, 10 Drawing Sheets

DIRECTION AND DISTANCE FINDER FOR LOCATING DISTRESS SIGNALS

This is a continuation-in-part of U.S. application Ser. No. 10/709,656 filed May 20, 2004 now U.S. Pat. No. 6,933,889 and of Provisional U.S. application Ser. No. 60/477,125 filed Jun. 9, 2003.

BACKGROUND OF THE INVENTION

1. Field of the Invention

The present invention relates to a direction and distance estimation system and method based upon characteristics of the Radio Frequency (RF) and the power path loss curve to locate victims.

2. Description of Related Art

Aircraft emergency locator systems such as ELTs (Emergency Locator Transmitters) and terrestrial location systems such as PLBs (Personal Locator Beacons) are well known in the existing art. Individuals lost at sea and fortunate enough to have emergency location identification devices such as an Emergency Position Indicating Radio Beacon (EPIRB), can send out RF signals with the hopes that their distress signals will be picked up by maritime stations or satellites, which can in turn, relay the information to the proper authorities.

Handheld or mobile location devices and systems can effectively locate the directional parameters associated with distress beacons; however, in order to obtain accurate distance readings, one must employ the use of satellites and global positioning systems (GPS). If a distress beacon emits a GPS signal to orbiting satellites, then a searcher may easily locate the distress beacon based upon the GPS reading. Many distress beacons currently being used are not equipped to transmit GPS readings and merely emit a RF signal for reception by a handheld, mobile, stationary or orbiting satellite receiver. As stated above, the RF receivers used to track and locate a RF signal from a distress beacon effectively locate the direction of the beacon, however reliable distance readings under this application are not possible. The lack of distance readings to the beacon can unnecessarily prolong or possibly imperil a search and rescue operation. If an individual is attempting to locate a person lost at sea, then initial movement of a search vessel is carefully monitored in order to prevent possibly running over the distressed victim. If the search vessel is a great distance from the distressed victim, then valuable time may be lost due to the necessity to move slowly during the searching process. If accurate distance readings were available, then the searching process could be shortened and therefore increase the likelihood of a successful rescue.

Directional and distance information may be equally important to search and rescue operations on land. Searchers may need to locate a distress beacon in dense woods or an urban metropolitan area. The beacon may be used by hikers, off road adventurers, skiers, campers and children. If the searcher is limited to directional data only, then even the effectiveness of a land search could be significantly diminished.

Avalanches are a great hazard to skiers, hikers and climbers and other people in mountain regions during winter. If a person is buried by snow, there is a very short period of time available to recover the person before he or she suffocates or dies of exposure due to the snow pack. The time factor in locating someone buried in an avalanche is a critical factor in the survival of the person buried. Electronic locating devices are known in the prior art to find victims of an avalanche that are buried under snow. Avalanche rescue devices manufactured by several companies transmit an RF signal on a frequency of 457 kHz. U.S. Pat. No. 6,031,482 issued to Lemaitre, et al., Feb. 29, 2000, discusses a method and system for sensing and locating a person, e.g. under an avalanche. Various types of electronic systems are discussed in this patent. U.S. Pat. No. 6,167,249 issued to Hereford, et al. discloses an avalanche victim locating transceiving apparatus that uses a plurality of different antennas that are arranged to provide directional and distance estimates to the victim along the lines of flux. None of the references exploit the RF characteristics of the field or power path loss curve to estimate a point to point direction and distance to an avalanche victim.

It would therefore be advantageous to provide a method and system for the location of a distress beacon that would provide the searcher with accurate distance and direction estimations. By providing a searcher with distance and directional estimations, the search time may be reduced significantly without endangering the distress victim. Although, the search and rescue operation has been discussed in association with sea and water rescue, distance estimations are also advantageous in regard to terrestrial search and rescue missions. It would also be advantageous if a handheld device facilitated the operation of the present system and method.

SUMMARY OF THE INVENTION

The present invention provides a system and method for locating the source of a RF signal. The present invention enables a user to locate the source of a RF signal as emitted by a distress beacon during a search and rescue operation. The present invention advantageously not only provides directional data as to the direction of the RF signal source, but also provides an estimated distance between a receiver and the RF signal source. A receiver according to the present invention advantageously provides direction and distance estimates based upon signal strength in a certain direction or over a certain distance.

In one exemplary embodiment of the present invention, a searcher using a signal locator (RF receiver) obtains the direction of the RF signal source, i.e., the distress beacon. The direction may be ascertained based upon signal strength readings taken by the locator where the strongest signal reading emits from the direction of the beacon. After obtaining the signal direction, the locator stores the initial RF signal strength reading and provides an estimated distance reading. The initial directional data and distance data provide an initial way point reading. The user may then proceed in the indicated direction and the locator produces continuous subsequent way point readings. The subsequent distance readings may be determined based upon the path loss slope of the received RF signals. As the distance between the receiver and beacon decreases, the path loss slope dramatically increases. The path loss slope is the x-y graph of the beacon signal power strength as a function of distance from the receiver to the RF beacon. The present invention advantageously exploits this phenomenon in order to provide accurate and effective distance estimations.

It is therefore an object of the present invention to provide a system that includes a signal locator where a graphical display resides on the signal locator. The graphical display provides the user with an initial way point reading that includes directional and distance data associated with the RF signal source. The directional and distance data is based upon the received RF signals. A processor within the locator receives, measures and stores RF peak signal strength of transmissions emitted by the RF signal source. The locator advantageously provides continuous subsequent way point readings for the user, where the subsequent way point readings include directional and distance data associated with the RF signal source. The distance data within the subsequent way point readings may be based upon a path loss slope of the received RF signals.

It is therefore another object of the present invention to provide a method for locating a RF signal source using a signal locator comprising the steps of: initiating a search mode for the signal locator; obtaining a direction for the RF signal source based upon a RF signal readings; moving a certain distance with respect to the direction of the signal and obtaining an initial waypoint reading, where the initial way point reading is based upon the rate of change of the RF signal strength as received by the signal locator; continuing to traverse with respect to the initial way point reading; and continuously obtaining subsequent way point readings based upon subsequent directional readings and subsequent distance readings, where the subsequent distance readings are based upon the rate of change of the RF signal strength as received by the signal locator.

It is therefore another object of the present invention to provide a method for locating a RF signal source using a signal locator comprising the steps of: initiating a search using the signal locator; maneuvering the signal locator toward a plurality of compass directions in order to obtain a RF signal strength in the plurality of compass directions; obtaining a direction for the RF signal source based upon a RF signal strength in the plurality of compass directions; providing an initial compass reading toward the signal source; advancing the signal locator in the direction of the initial compass reading; initiating a way point reading, based on the directional readings and distance readings, where the distance readings are based upon the rate of change of the RF signal as received by the signal locator; continuing to advance the signal locator; initiating a subsequent way point reading, based on subsequent directional readings and subsequent distance readings, where the subsequent distance readings are based upon the rate of change of the RF signal as received by the signal locator; continuing to advance the signal locator; and repeatedly initiating subsequent way point readings until the RF signal source is located.

The present invention also provides a system and method for locating an avalanche victim. Many of the avalanche rescue systems that are currently being manufactured use an avalanche beacon that transmits an RF signal at 457 kHz (amplitude modulated) that is attached to the person buried in the avalanche for location. Typically, the victim's transmitter emits a dipole flux pattern (magnetic field pattern). The present invention enables a searcher with a receiver built in accordance with the present invention to locate the source of this transmitted field as emitted by a distress beacon during a search and rescue operation. The present invention not only provides point to point directional data as to the direction of the RF field source based on flux field characteristics, but also provides an estimated distance between the searcher's receiver and the victim's transmitter field source using path loss slope and/or triangulation. A receiver in accordance with the present invention advantageously provides direction and distance estimates based upon field signal strength transmitted by the victim's transmitter avalanche or field strength changes in a certain direction with regard to the flux lines and/or over a certain distance.

In the event of an avalanche in which one or more persons are buried, each having an avalanche beacon transmitting at 457 kHz, a searcher using a receiver in accordance with the present invention obtains the estimated direction and distance of the RF magnetic field source based on transmissions from the victim's avalanche beacon. The direction may be ascertained based upon field strength readings taken by the receiver of the searcher where the strongest field strength reading is oriented parallel to the induction line from the distress transmitter. After obtaining the direction of the induction lines, the searcher moves a certain distance (e.g., eight feet) in any direction while receiving more signal strength data and flux line direction information enabling the algorithm in the receiver to analyze the data, which includes geometric calculations for direction (defined as triangulation mode for avalanche beacons) and direct the searcher in the best direction to obtain optimum data or towards the location of the distress beacon source. The distance to the distress beacon source from the searcher is calculated using the path loss slope mode (high rate of change of field strength close to the transmitter and a decreasing slope the further away from the transmitter one is). The signal strength may be also used to determine distance if the radiated power of the victim's transmitter is known, which is commonly the case with avalanche beacons. The searcher may then proceed in the indicated direction where additional data and processing results in increased accuracy of the location of the distress beacon (RF source). The path loss slope is the x-y graph of the beacon signal power strength as a function of distance between the distress beacon and the searcher's receiver location in the field. The present invention provides a system that includes a receiver in accordance with the invention that may also include a graphical display to provide the searcher with an initial way point reading that includes direction and estimated distance data associated with the magnetic field source.

It is an object of this invention to provide an avalanche victim locator that includes estimates of direction and distance to the distress beacon of the person that is the victim of an avalanche.

In accordance with these and other objects which will become apparent hereinafter, the instant invention will now be described with particular reference to the accompanying drawings.

DETAILED DESCRIPTION

The present invention provides a system and method that enables swift and accurate location of a RF signal source such as emitted by a distress beacon. The present invention advantageously uses path loss slope readings in order to eventually locate the RF signal source that is transmitted by the distress beacon. The present invention enables a user to acquire data with a handheld device and determine direction and distance of a RF signal source. The direction is determined based upon signal strength and the distance reading may be determined based upon power level changes that occur over the distance traveled, defined as power path loss slope.

Figure 1:
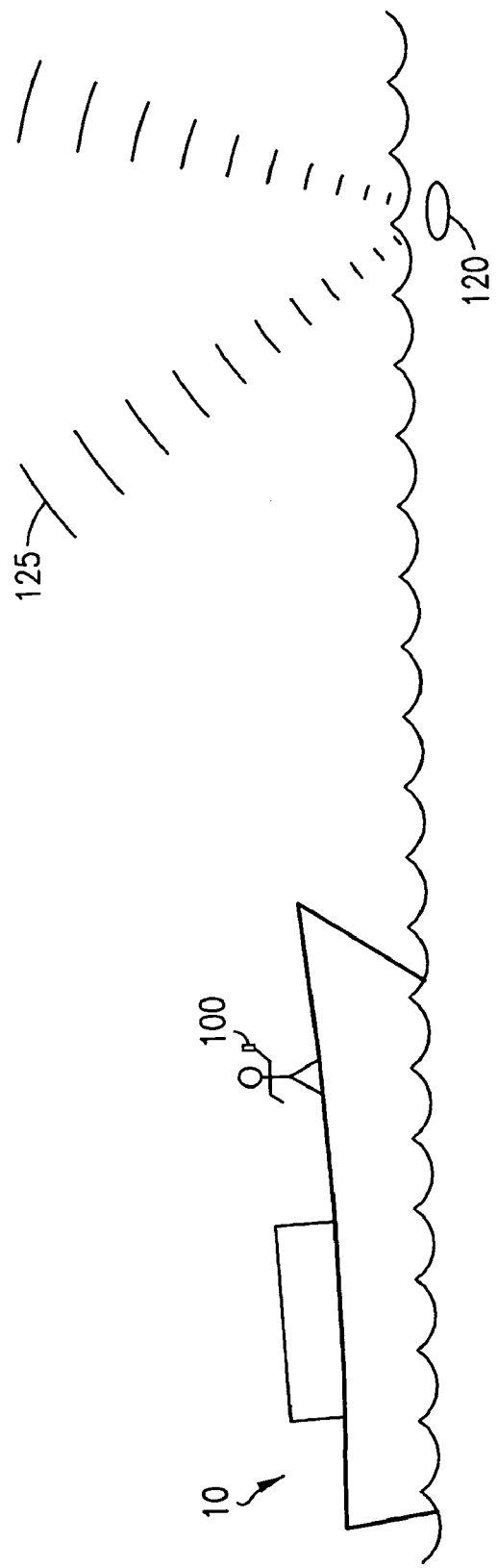
FIG. 1 shows a symbolic exemplary overview of a locating system according to the present invention.

Referring now to FIG. 1, a symbolic exemplary overview of a rescue directional locating system according to the present invention is shown. A RF transmitting beacon 120 floats on a body of water or is attached or held above the water by a person requiring location and rescue depicting a search and rescue situation. However, the present invention may be used in various other applications such as land based rescue missions and law enforcement applications, i.e. stolen vehicle recovery or fugitive apprehension. The beacon 120 preferably is attached to a person or object above the water surface and emits continuous RF signals 125 of a predetermined frequency. A RF signal locator 100 on vessel 10 receives the RF signal 125 and provides the user with way point readings to assist in the location of the beacon 120.

Figure 2:
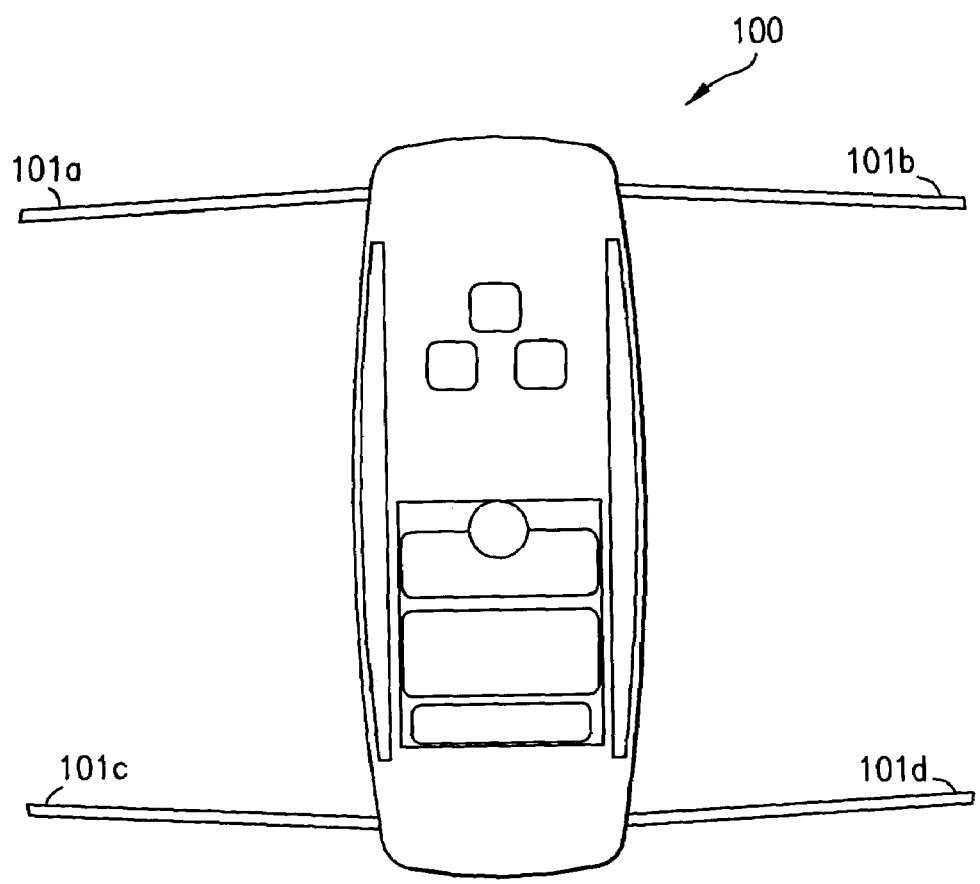
FIG. 2 shows a top plan view of a locator (RF) receiver according to the present invention.
Figure 3:
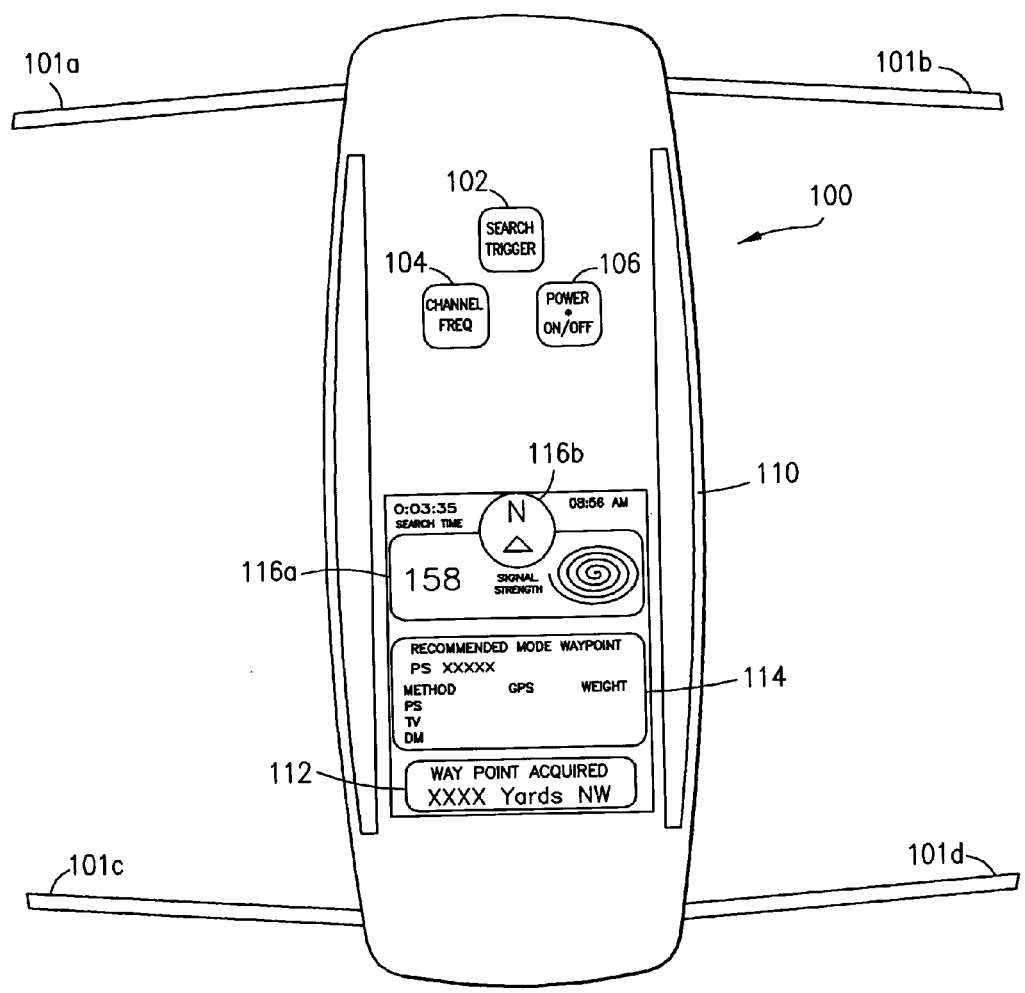
FIG. 3 shows a top plan view of the receiver shown in FIG. 2 including an exemplary graphical display according to the present invention.

FIG. 2 shows the face of a locator, RF signal locator 100 according to the present invention. Antennas 101a–101d extend from the base of signal locator 100 in order to receive RF signals upon activation by the user. FIG. 3 shows a graphical interface and control buttons associated with the signal locator 100. A power control button 106 activates the signal locator 100 for operation. Before initiating a search, the user sets the search frequency by using a channel frequency selector 104. The receiver may be set at any desired search frequency, although a number of the search and rescue missions involve locating beacons that transmit at 121.5 MHz. During operation a user may initiate a data acquisition by using an electrical switch represented as a search trigger 102. Although, trigger 102 is shown as a control switch button, the trigger may also be activated through the use of an actual trigger, not shown, on the underside of the signal locator 100. Another contemplated embodiment includes the signal locator 100 without any triggering mechanism, wherein the signal locator 100 upon activation continuously measures power changes in order to determine the path loss slope. A processor, not shown, within the receiver provides distance estimations based upon the path loss slopes.

A graphical reading display (GRD) 110 provides a display of the real time data and output data processed during the search. A RF signal strength display 116a shows the signal strength reading numerically and graphically. A user pivots or rotates in a 360 degree direction while pointing the signal locator 100 outwardly toward different compass headings in order to initially locate the direction of the RF signal source. The RF signal strength display 116a displays the real time power levels, wherein the power level readings assist in determining the direction of the signal source. Above the RF signal strength 116a, compass 116b displays the direction that the signal locator 100 is pointing and changes accordingly upon movement. Below the signal strength display 116a, a search data display (SDD) 114 provides the user with specific data regarding the different search modes and the associated weighting of each mode.

The signal locator 100 includes three search modes: power slope calculation, triangular vectors and data mapping. Each search mode is always active and uses global positioning system (GPS) data, direction data and power level data to associate the resulting way points for each mode with an associated weight, i.e. confidence factor. The mode that is weighted the heaviest is displayed on the recommended mode way point section of the display using a standard GPS reading protocol. The SDD 114 displays the GPS reading for each search mode below the recommended mode way point and provides the weighting for each reading. The factors for processing which way point to use of the different modes are the distance traveled toward, away or perpendicular to the RF beacon signal and whether a directional antenna is being used.

Below the SDD 114, a way point display (WPD) 112 provides the user with specific compass direction and distance information. The compass direction and distance information gives the user the estimated distance and direction of the RF signal beacon source. The distance and direction information may change as more data is acquired and processed, and consequently more accurate readings are produced as the user approaches the RF signal source.

Figure 4A:
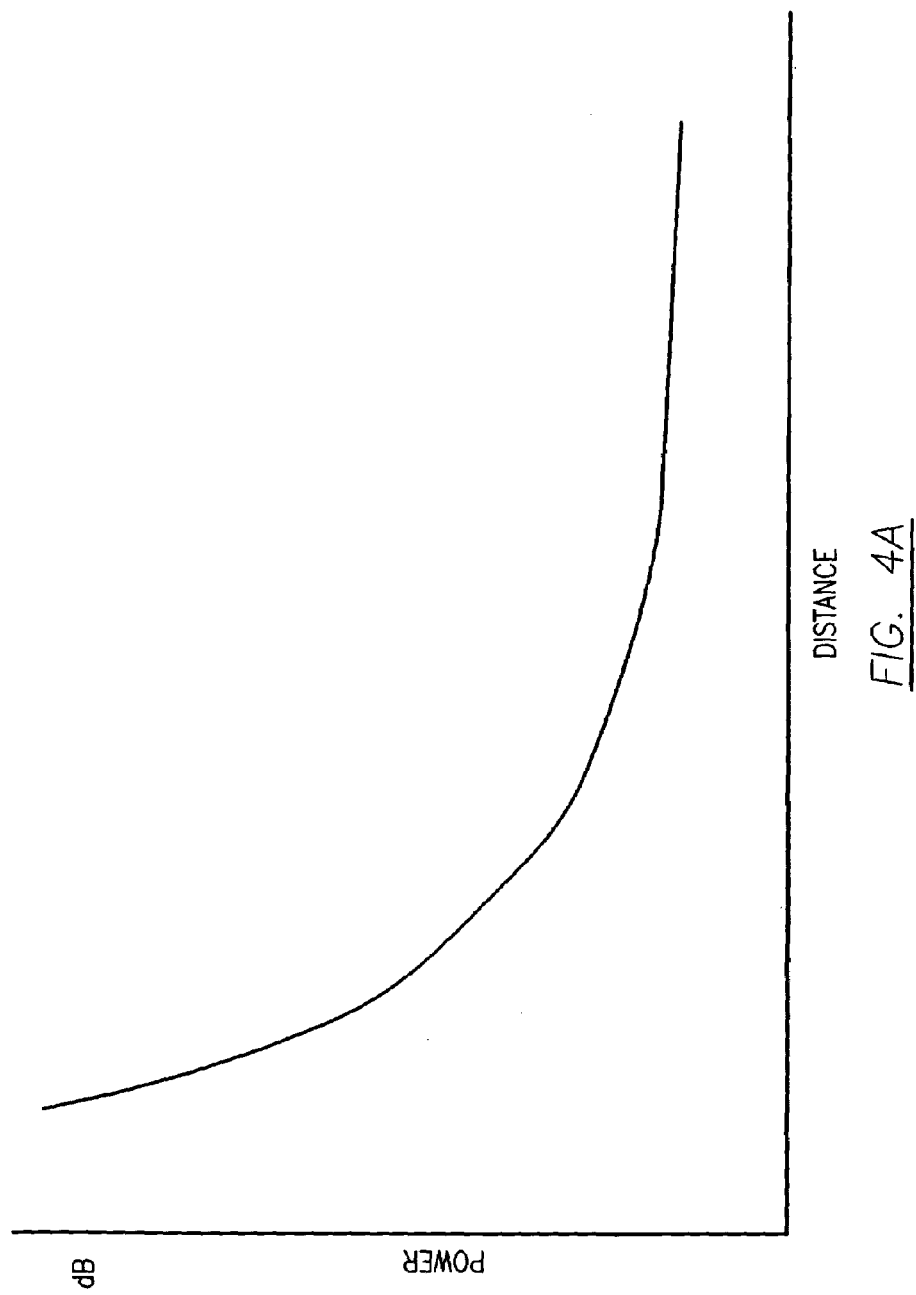
FIG. 4A shows a graph of RF signal strength path loss characteristics.
Figure 4B:
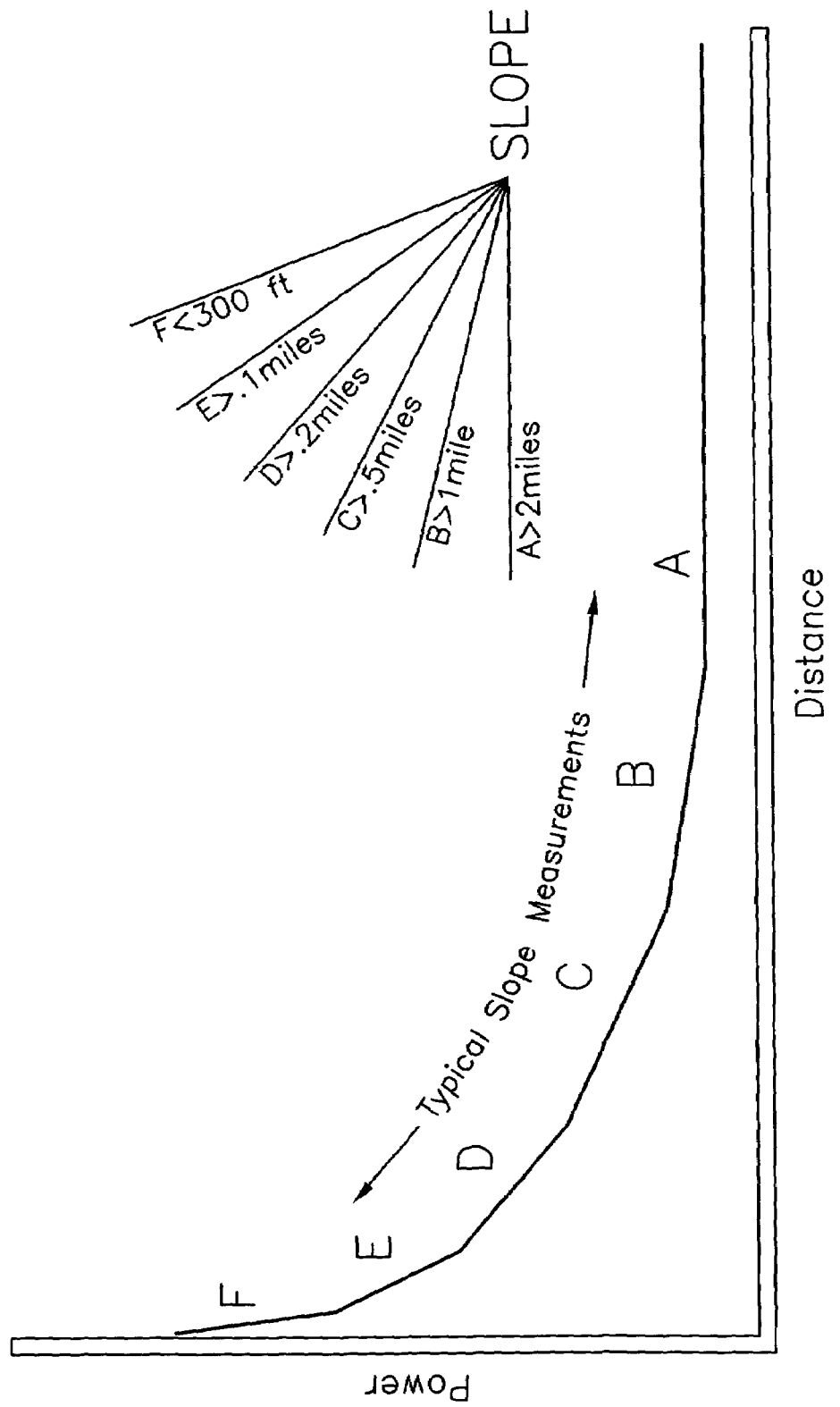
FIG. 4B shows a graph displaying exemplary slopes associated with a path loss curve according to the present invention.

Referring now to FIG. 4A, a graphical display of RF signal power v. distance is shown. Distance is measured between the RF beacon signal source and the locator, RF receiver. The graph of FIG. 4A shows that as distance increases, the slope associated with the path loss curve decreases to substantially zero. When a larger distance separates the signal locator 100 and the RF signal source, the signal locator 100 displays a large distance number for the way point 112. Under most circumstances the accuracy of the way point reading at longer distances is not critical. The user simply knows at longer distances, one must simply traverse a substantial distance in order to locate the beacon. As the user continues the search toward the RF signal source and obtains more data, the receiver will read a greater slope change and appropriately provide the user with a smaller and more accurate way point reading closer to the distress signal. The present invention therefore allows the user to locate the RF signal source based upon the slope characteristics of the path loss curve. Referring to FIG. 4B, slope readings A–F along the path loss curve are depicted. As the distance decreases, the slope readings increase A–F. Accordingly, a user receiving readings at two miles or greater clearly understands to generally proceed in the appropriate direction and that the RF signal source is a large distance away from the signal locator 100. Having a greater certainty that the RF signal source is a substantial distance from the receiver, the user may move more swiftly without fear of over shooting the RF signal source. If the user is performing a water search and rescue, then the user does not need to fear possibly running into the RF signal source or the person in distress when receiving way point readings that represent longer distances. The distance readings based on the power slope enable users to more quickly pinpoint the RF signal source and more effectively perform a search and rescue.

Figure 5A:
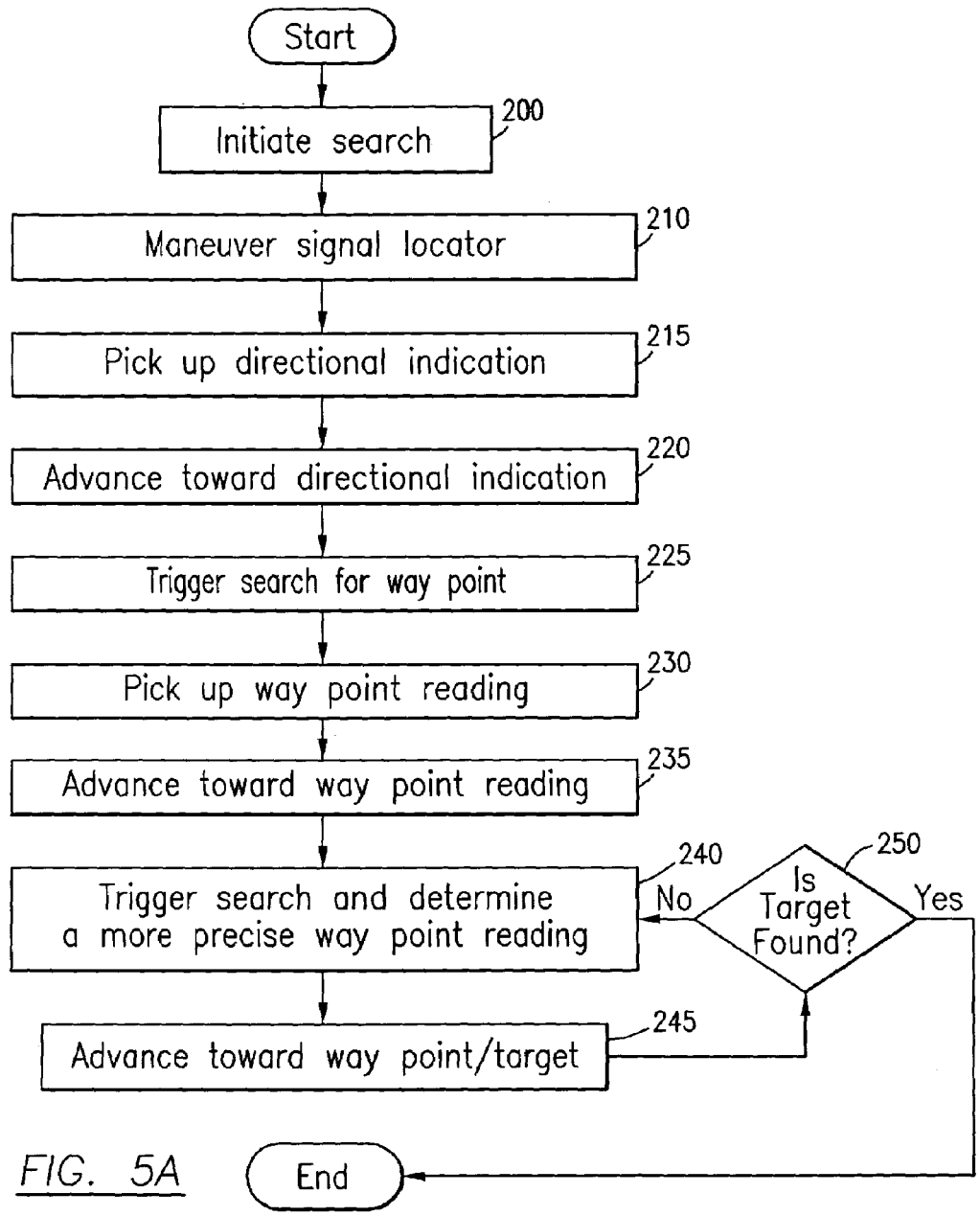
FIG. 5A shows a flow chart describing a preferred locating method according to the present invention.

FIG. 5A shows a flow chart describing the preferred method according to the present invention. A user first initiates the search mode on the signal locator 100, step 200. The user then maneuvers the signal locator 100, step 210, in order to pick up a directional indication, step 215. The user begins to advance in the direction as indicated, step 220. Next, the user manually engages the search trigger 102 (FIG. 3) to search for a way point reading, step 225, and the locator 100 provides the way point reading, step 230. The user continues in the direction of the way point reading, step 235, and manually triggers a subsequent search for a more precise way point reading, step 240. The user continues to advance in the direction of the way point/target, step 245, and repeats subsequent searches using trigger 102 until the RF signal source is found, step 250.

Figure 5B:
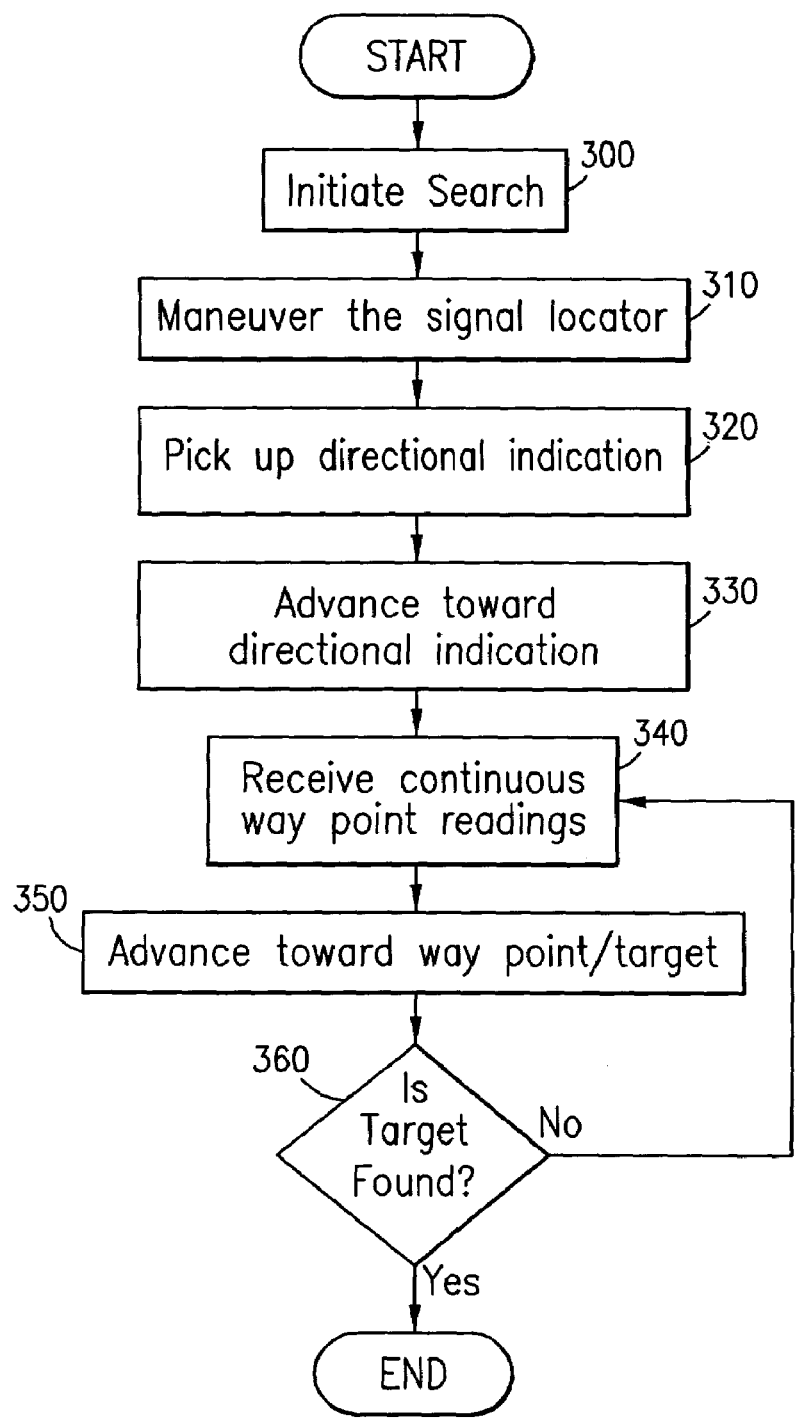
FIG. 5B shows a flow chart describing an alternate exemplary locating method according to the present invention.

FIG. 5B shows an alternative method according to the present invention. The user initiates a search, step 300. The user then maneuvers the signal locator 100, step 310, in order to pick up a directional indication, step 320. A processor in the signal locator automatically is preprogrammed to provide way points based on different variables such as signal strength and location. Next, the user begins to advance in the direction as indicated, step 330, while advancing the user receives continuous way point readings where the distance component is based on path loss slope 340. This exemplary method allows the user to continuously advance toward the way point/target, step 350, until the target is found, step 360. Both the methods of FIGS. 5A and 5B provide the user with increasingly accurate way point readings as the user progresses toward the RF signal source. Both methods use the path loss slope to quickly and efficiently located the signal source and thus substantially minimize search time.

Figure 6:
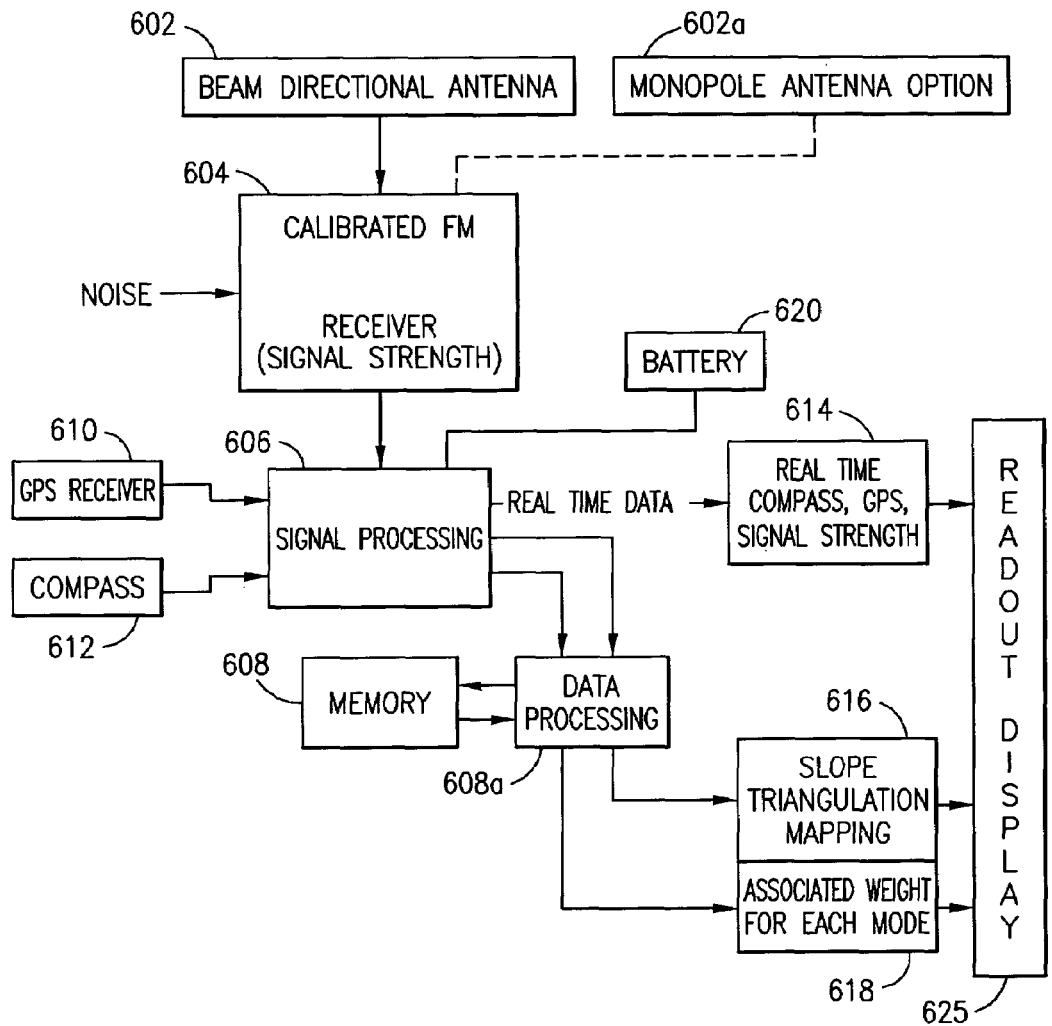
FIG. 6 is a block diagram of the operation of the locator receiver to provide path loss slope data.

Referring now to FIG. 6, the direction distance finding system contained inside the receiver is shown in the block diagram. Beam directional antennas 602 are connected to a calibrated frequency modulation (FM) receiver 604 that receives the RF signal and determines the RF signal's strength. The receiver 604 filters any noise associated with the RF signal. The RF signal received from the beacon, which is a FM signal, is then sent to a signal processing unit 606. The signal processing unit 606 also receives data from a GPS receiver 610 and a compass 612. A battery 620, connected to the signal processing unit, provides power to the system. The signal processing unit 606 provides real-time data to the real-time compass, GPS and signal strength displays 614 for display on a readout display 625. The signal processing unit 606 also sends data to a data processor 608a, where the data processor 608a outputs predicted distance, direction and GPS coordinates based on the slope, triangulation or data mapping modes and the direction of the strongest signal strength where an associated weight for each mode 618 shows on the readout display 625. The data processor 608a functions based upon instructions from a memory unit 608 which also stores data received from the data processor 608a. Based on the information received by the signal processing unit 606, when the user activates a switch such as a trigger, the signal processing unit 606 will provide the new waypoint readings in the embodiment that includes a trigger for use by the user. Sensitivity down to −113 decibels milliamps is typical for the handheld version. By using the signal processing unit 606 and the memory 608, the receiver can provide predicted distance readings based on relative signal strength as the user approaches the beacon.

Figure 7:
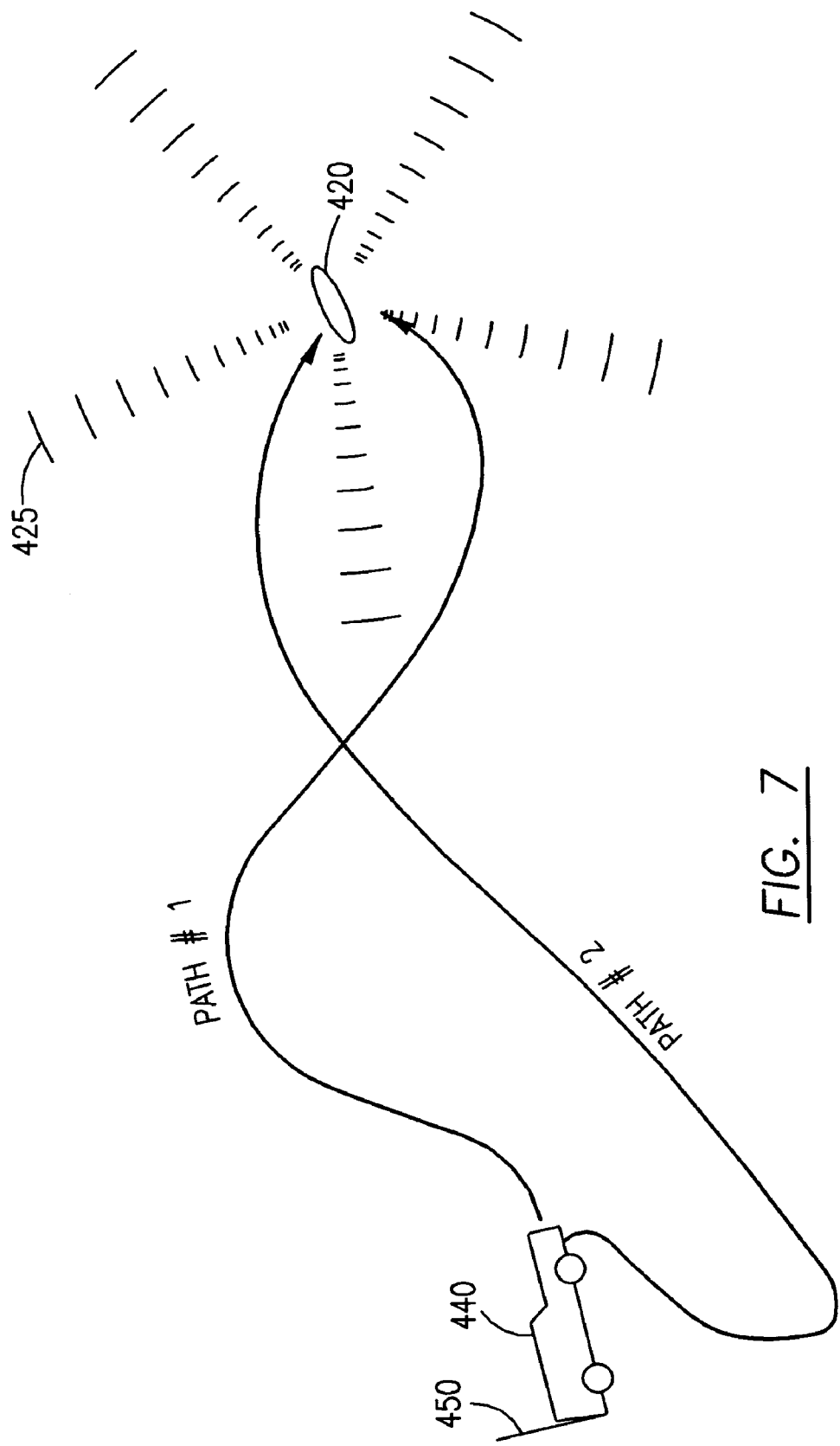
FIG. 7 is another exemplary application of the location system according to the present invention.

Referring now to FIG. 7, another exemplary application of the present invention is shown. A monopole antenna 450 installed on a vehicle 440 receives RF signals 425 emitted by a source beacon 420. A user in the vehicle 440 initiates a search for the beacon 420 by traveling over a certain area. A signal locator display, not shown, provides information to the user regarding the reception received by the antenna 450. FIG. 7 shows two exemplary paths that may be traversed by the vehicle 440 in order to locate the beacon 420. Based upon the operator of the signal locator and the route available to the user, either path #1 or path #2 may be traversed in order to locate the beacon 420. Regardless of the route endeavored by the user, the signal locator consistently enables the user to locate beacon 420. Different resultant paths may be traversed due to the terrain, buildings and atmospheric conditions, all of which may affect the received signal. The signal locator obtains initial signal strength and displays a waypoint based upon subsequent strength readings of the received RF signal over a certain area. The signal locator continuously receives RF signals and generates subsequent way point readings based on the received RF signal. The subsequent way point readings guide the user to the beacon 420 and allow the user flexibility in traversing toward the beacon 420 based upon terrain and environmental conditions.

The present invention is capable of providing direction and distance estimates to one or more avalanche victims each having an avalanche beacon for transmitting emergency distressed signals from the victim in the event the victim is covered by an avalanche. The principles of operation of the present invention discussed above are also applicable for use with avalanche beacons which are, typically, RF transmitters, many of which operate at 457 kHz frequency. The present invention tracks the timing of each of the victim's transmissions to obtain data for locating multiple victims.

The present invention also provides a system and method for locating the RF source if the transmitter emits a dipole flux pattern (magnetic field pattern). The present invention enables a searcher to locate the source of this field as emitted by a distress beacon (e.g. avalanche beacon 457 kHz amplitude modulated) during a search and rescue operation.

The present invention advantageously not only provides directional data as to the direction of the RF field source, but also provides an estimated distance between a searcher signal receiver and victim's transmitter field source using path loss slope and/or triangulation (geometric calculations when searching for avalanche victims). A receiver according to the present invention advantageously provides direction and distance estimates based upon field signal strength, or field strength changes, in a certain direction with regard to the flux lines and/or over a certain distance.

In one exemplary embodiment of the present invention, a searcher using a receiver obtains the estimated direction and distance of the RF magnetic field source, i.e., the distress beacon.

The direction may be ascertained based upon field strength readings taken by the receiver where the strongest field strength reading is oriented parallel to the induction line from the transmitter. After obtaining the direction of the induction lines, the searcher moves a certain distance (e.g., eight feet) in any direction while receiving more signal strength data and flux line direction information enabling the algorithm to analyze the data and direct the searcher in the best direction to obtain optimum data or towards the location of the source.

The distance would be calculated using the path loss slope mode (high rate of change close to the transmitter and a decreasing slope the further away from the transmitter one is). The signal strength may also be used to determine distance if the radiated power of the transmitter is known, which is commonly the case with avalanche beacons.

The user may then proceed in the indicated direction where additional data and processing results in increased accuracy of the location of the RF source.

The source location of the RF magnetic field is determined based on the algorithm's calculations using one or more of the following:

a. the direction of the flux lines;
b. the direction of the flux lines with respect to each other and taking into consideration the characteristics of the fields, including near and far fields;
c. the field strength in the said flux field direction and 180 degree in the other direction;
d. the flux line path (curve) taken with regard to the offset (change in direction) from a straight tangential line referenced from the original direction of the flux lines;
e. the field strength rate of increased (based on path loss slope and flux line direction and the characteristics of the field) while obtaining more data or traversing towards the source;
f. the maximum signal strength may be used to estimate distance when the radiated power of the transmitter is known; and
g. the transmission duration and timing.

In general, yielding to the complexity of the field characteristics, as the distance between the receiver and beacon decreases, the path loss slope dramatically increases.

Figure 8:
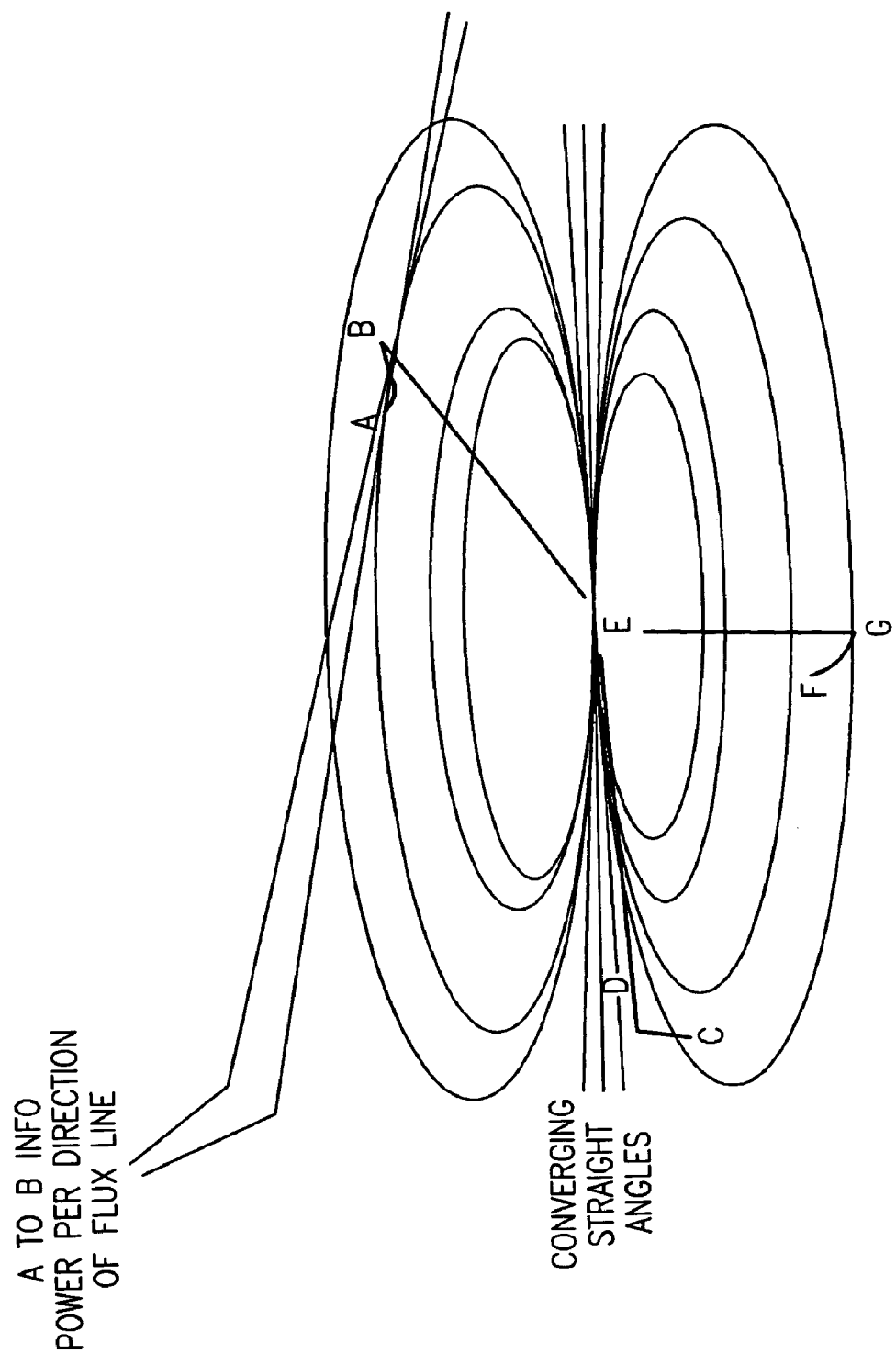
FIG. 8 is a schematic drawing illustrating the operation of the avalanche detector using three separate paths for locating an avalanche victim used in accordance with the present invention.

Referring now to FIG. 8, three examples of different avalanche beacon search paths are shown that use direction and distance finding. The assumption is that a victim is located under an avalanche at the letter "E." Dipole radiation from the victim's transmitter is shown as elliptical lines from "E." A first path using the present invention with a receiver to locate the victim "E's" transmitter could begin at point "A" to point "B." From point "A" to point "B," received flux information is processed to display the direction and distance to the transmitter "E." The path then from "B" to "E" increases the rate of change of signal strength as the distance decreases. Using geometry, the known characteristics of a dipole flux pattern which is shown in FIG. 8, path loss slope or signal strength, and compass direction, the algorithms in the present invention calculate the estimated location of the beacon at position "E."

Using a second path, the rescuer at "F" traverses to point "G." Flux information is processed to display the direction and distance then from "G" to "E."

In a third separate path to locate the victim at "E" from a rescuer located at point "C," from "C" to "D" flux information is processed that will provide in the rescuer, the direction and distance to "E."

Thus, using three different examples of different paths in the vicinity of the avalanche victim located at "E" using the present invention, rescuers starting at point "A," point "F" or point "C" can determine not only the direction of the victim's transmitter at "E" but also calculate the approximate distance. As shown in FIG. 8, there is peak power in the direction of the flux lines. The difference between the two directions (tangents from A and B) while traveling along them provides the data to the processor necessary to indicate the general location of the transmitter. Additional data taken when during the search improves the accuracy.

The path loss slope is the x-y graph of the beacon signal power strength as a function of distance and the searchers location in the field.

The present invention advantageously exploits a 457 kHz amplitude modulated (AM) dipole flux pattern that would be typical of an avalanche beacon.

A graphical display may provide the user with an initial way point reading that includes directional and distance data associated with the magnetic field source.

The estimated location of the distress signal (RF field source) could be relative distance in a compass direction or with data processing and a true north declination offset could be a GPS coordinate on a detailed color map.

The directional and distance data is based upon the received RF signals. A processor within the locator receives, measures and stores RF peak signal strength of transmissions emitted by the RF signal source through the use of algorithms. The locator advantageously provides continuous subsequent way point readings for the user, where the subsequent way point readings include directional and distance data associated with the RF signal source. The distance data within the subsequent way point readings may be based upon a path loss slope of the received RF signals.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for locating a RF signal source from an avalanche distress beacon from a victim buried in an avalanche using a signal locator comprising:
  a. initiating a search using the signal locator;
  b. maneuvering the signal locator toward a plurality of compass directions in order to process RF signal strength data of the avalanche beacon in the plurality of compass directions;
  c. moving a small distance and again maneuvering the signal locator toward a plurality of compass directions in order to process RF signal strength data of the avalanche beacon in the plurality of compass directions;
  d. obtaining a directional and distance output (waypoint) of the RF signal source of the avalanche beacon based upon the output of algorithms;
  e. advancing the signal locator towards the initial way point reading.
  f. initiating a subsequent way point reading, based on subsequent directional readings and subsequent distance readings, where the subsequent distance readings are based upon the rate of change of the RF signal from the avalanche beacon as received by the signal locator;
  g. continuing to advance the signal locator; and
  h. repeating steps f–g until the RF signal source from the avalanche beacon is located.

2. The method for locating the source of a RF signal according to claim 1 further comprising the step of:
  a. triggering each subsequent way point reading.

3. The method according to claim 1, wherein said way point reading is displayed using GPS coordinates.

4. The method according to claim 1, further comprising the step of:
  a. designating a RF signal frequency.

5. The method for locating the source of a RF signal according to claim 1, further including the step of providing at least one search mode.

6. The method for locating the source of a RF signal according to claim 5, wherein the at least one search mode includes a power slope mode, a triangulation (geometrical calculation) mode and a data mapping mode.

7. The method for locating the source of a RF signal according to claim 1, further including the step of providing a visual display for the signal locator.

8. The method for locating the source of a RF signal according to claim 7, further including the steps of:
  a. incorporating a signal strength reading on the visual display;
  b. displaying the initial way point reading on the visual display; and
  c. displaying a recommended search mode on the visual display.

9. The method for locating the source of a RF signal according to claim 7, further including the step of providing a GPS coordinate for each search mode.

10. The method for locating the source of a RF signal according to claim 1, wherein said signal locator is at least one of a handheld signal locator and a mobile signal locator.

* * * * *